Sept. 3, 1963    M. CARAGE    3,102,687
METHOD OF AND APPARATUS FOR HANDLING CASH RECEIPTS
AND RESETTING KEYS FOR CASH REGISTERS
Filed Nov. 21, 1961    7 Sheets-Sheet 1

Inventor
Michel Carage
by Michael S. Striker
Attorney

Sept. 3, 1963 M. CARAGE 3,102,687
METHOD OF AND APPARATUS FOR HANDLING CASH RECEIPTS
AND RESETTING KEYS FOR CASH REGISTERS
Filed Nov. 21, 1961 7 Sheets-Sheet 2

Sept. 3, 1963　　　　　　　　M. CARAGE　　　　　　　　3,102,687
METHOD OF AND APPARATUS FOR HANDLING CASH RECEIPTS
AND RESETTING KEYS FOR CASH REGISTERS
Filed Nov. 21, 1961　　　　　　　　　　　　　　　　7 Sheets-Sheet 3
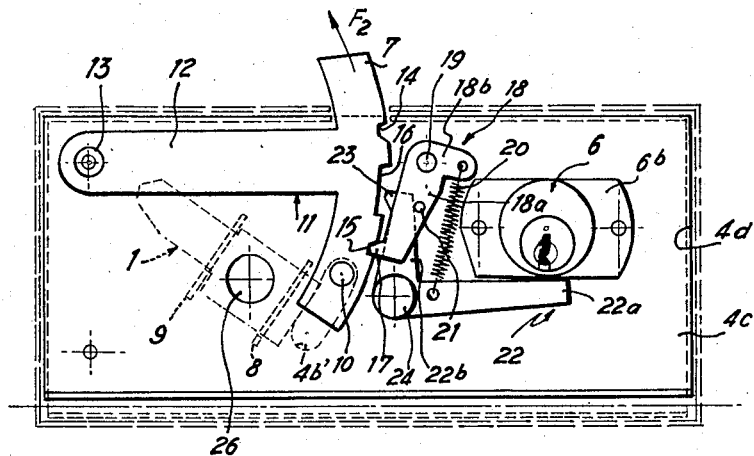
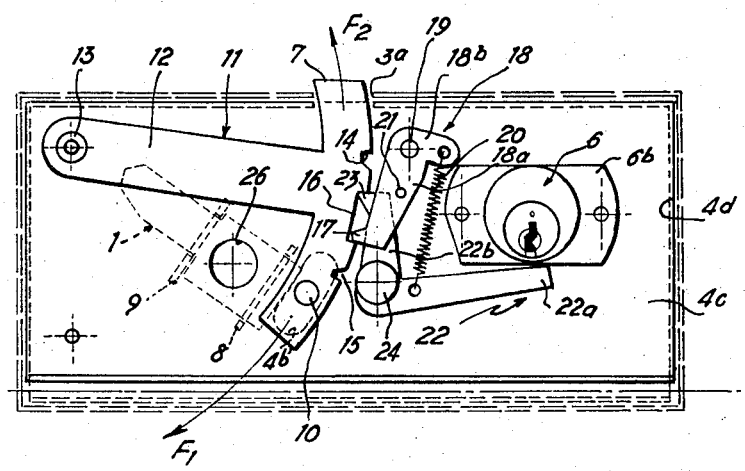

Sept. 3, 1963 M. CARAGE 3,102,687
METHOD OF AND APPARATUS FOR HANDLING CASH RECEIPTS
AND RESETTING KEYS FOR CASH REGISTERS
Filed Nov. 21, 1961 7 Sheets-Sheet 4
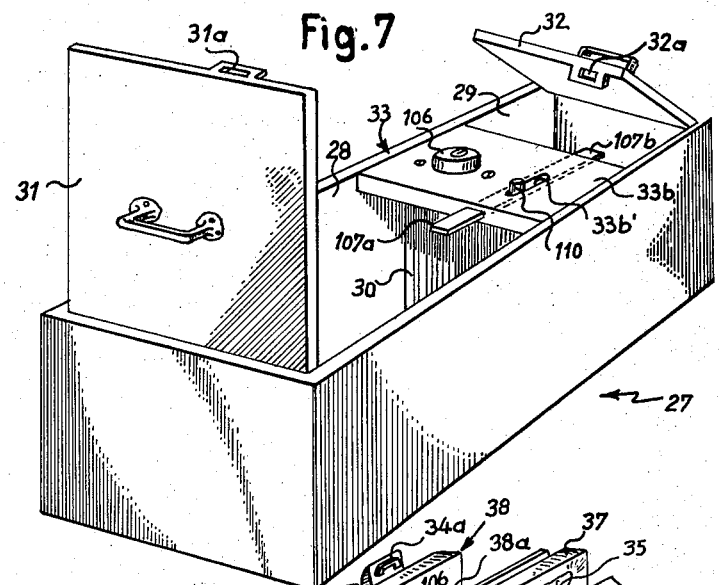
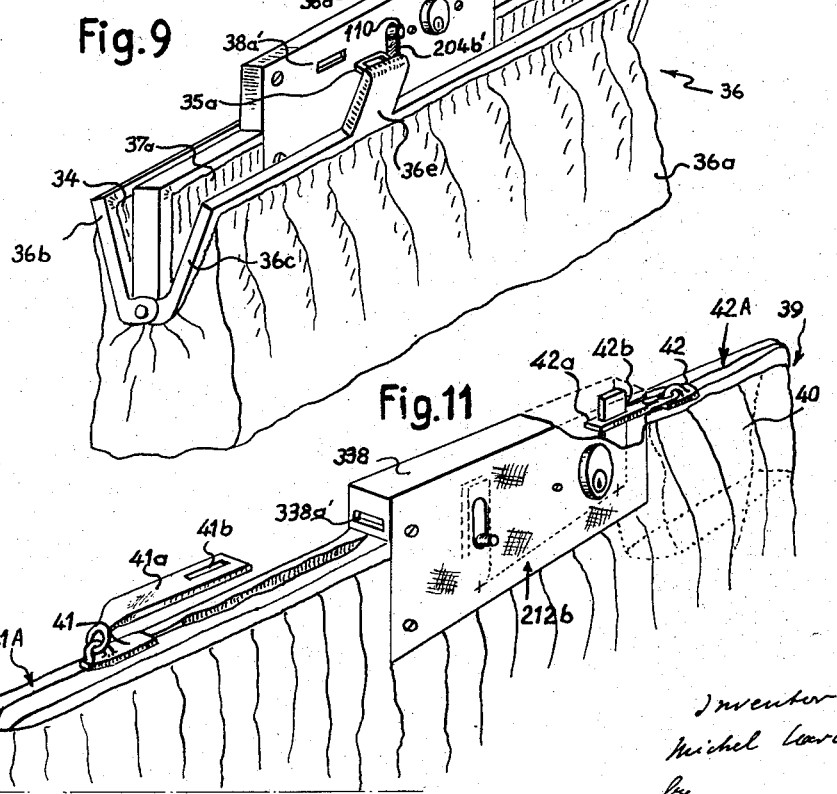
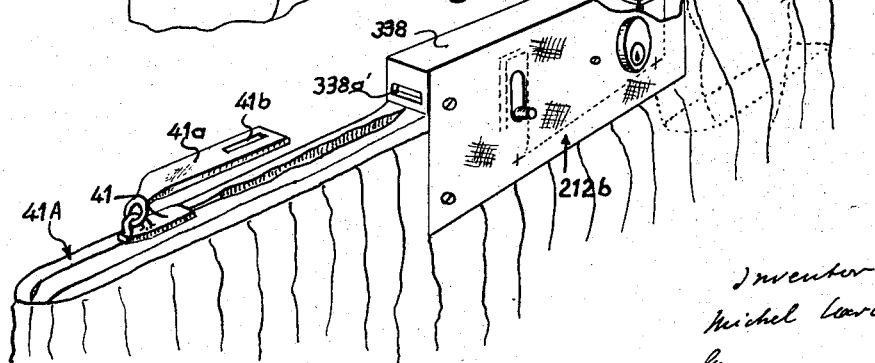

Sept. 3, 1963   M. CARAGE   3,102,687
METHOD OF AND APPARATUS FOR HANDLING CASH RECEIPTS
AND RESETTING KEYS FOR CASH REGISTERS
Filed Nov. 21, 1961   7 Sheets-Sheet 5

Inventor
Michel Carage
by Michael S. Striker
Attorney

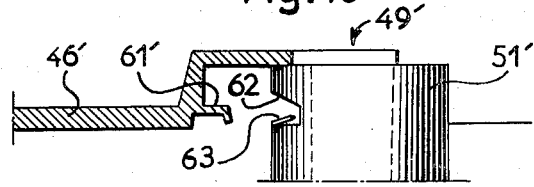
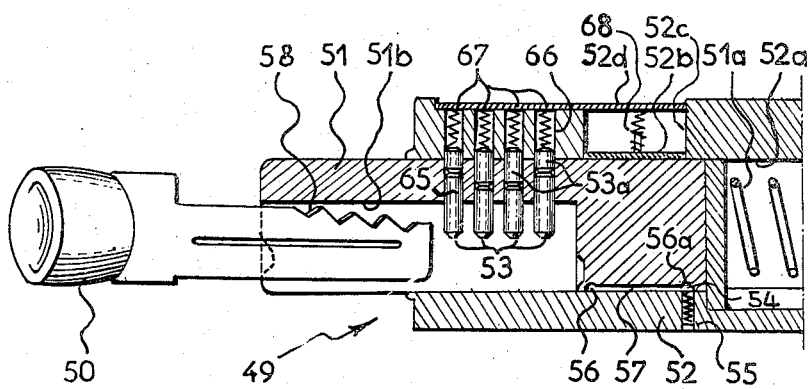
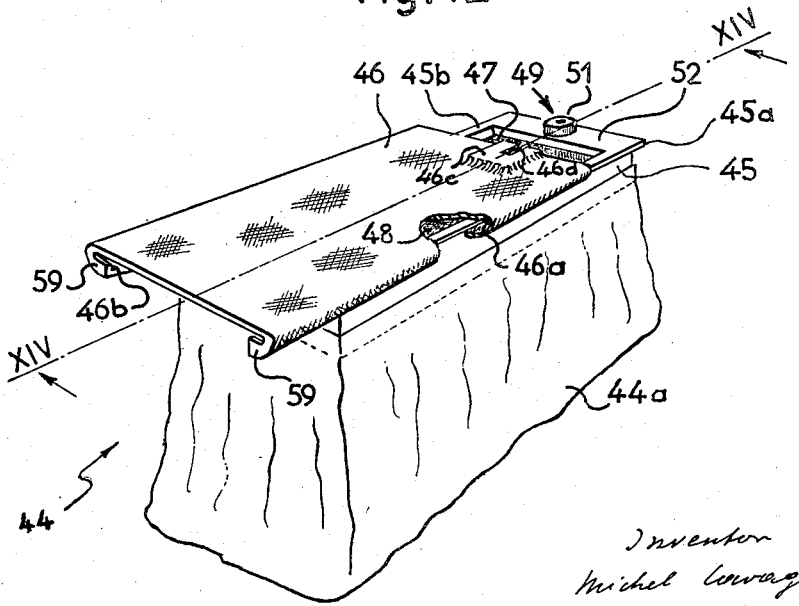

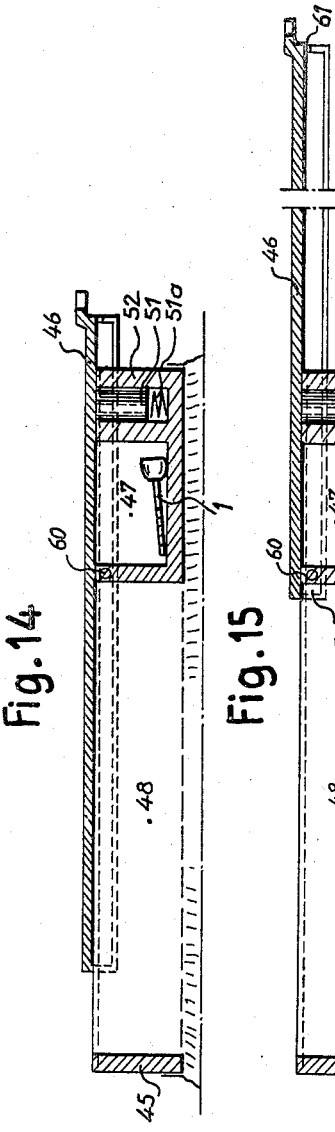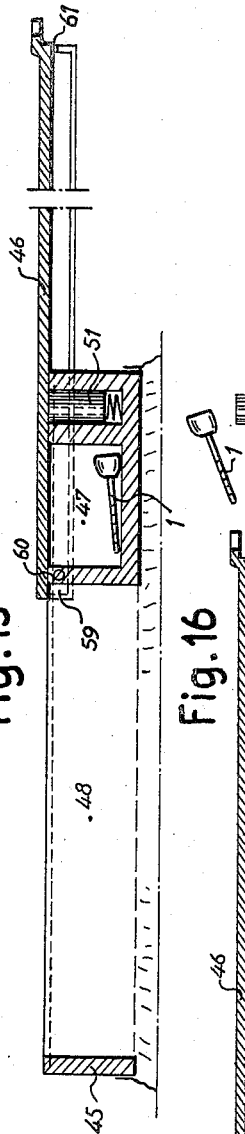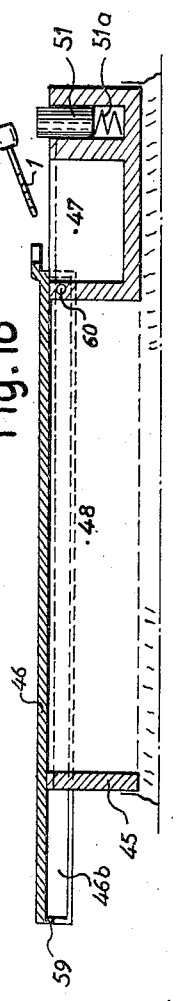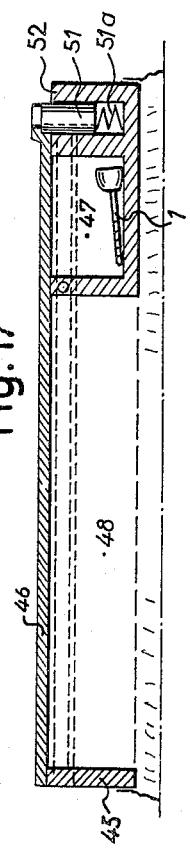

United States Patent Office 3,102,687
Patented Sept. 3, 1963

3,102,687
METHOD OF AND APPARATUS FOR HANDLING CASH RECEIPTS AND RESETTING KEYS FOR CASH REGISTERS
Michel Carage, 12 Blvd. Jean-Mermoz, Neuilly-sur-Seine, France
Filed Nov. 21, 1961, Ser. No. 153,909
Claims priority, application France Apr. 14, 1961
20 Claims. (Cl. 235—130)

The present invention relates to portable safes in general, and more particularly to a receptacle for collecting cash and balance slips from cash registers in commercial and like establishments. Still more particularly, the invention relates to an arrangement which may be utilized by a cashier or salesman-cashier as a receptacle for cash, checks etc. accumulated in the cash register during a predetermined period, and which enables the cashier to reset (i.e. to restore to zero) and to obtain a balance slip from the cash register by simultaneously preventing the cashier from fraudulently adjusting the sum total of cash receipts so that such sum total would correspond to the figure indicated on the balance slip.

At the end of a working day or at the end of the shift completed by a cashier or salesman-cashier, the sum total of money, checks etc. collected by the cashier should correspond to the amount which is automatically recorded by the cash register. If, at the end of a working day or at the end of a shift, the cashier were in a position to lay hands on the cash receipts after having obtained the balance slip, he could fraudulently change the sum total of cash receipts so that this sum total amount would correspond to the amount indicated on the balance slip. As is known, the balance slip is obtainable with the help of a special actuating or resetting member, known as zero key or Z key, which is inserted into the cash register not only to obtain the balance slip but also to restore to zero the counter mechanism of the cash register. Were the cashier in a position to obtain the actuating member (hereinafter called Z key throughout this description) at a time he is still in possession of the cash receipts, he could either remove some cash or he could add some cash so as to make sure that the sum total of cash receipts corresponds to the amount indicated by the balance slip. Such fraudulent manipulation of cash receipts would be impossible to detect.

In order to prevent such manipulation of cash receipts, the stores utilizing cash registers and employing one or more cashiers or salesmen-cashiers now resort to the following precautionary measures: At the end of a day or at the end of a shift, and before leaving the department store or a similar establishment, the cashier places the cash receipts into a suitable bag or a like receptacle and hands the bag to a person in charge, hereinafter called a supervisor. It is often required that the cashier write a short sales report which he signs and thereupon places into the bag together with the cash receipts. The supervisor who is now in possession of the bag containing the sales report and the cash receipts thereupon utilizes his own Z key to restore or "re-cite" to zero the counter mechanism of the cash register and to obtain the balance slip which, if the cashier was careful and honest, indicates a figure which equals the sum total of cash receipts previously handed over to the supervisor. The amount indicated by the balance slip is debited to the cashier and must equal or approximate the sum total of cash receipts.

On the same day or on a following day, the control or accounting department of the establishment counts the cash receipts in the bag and compares the sum total with the figure on the balance slip and with the short sales report of the cashier. As a rule, the figure indicated by the balance slip does not correspond exactly to the sum total of cash receipts because errors may occur when the cashier returns change to his customers or if the cashier errs in actuating the keys of the cash register. Such errors which are more frequent on busy days when the cashier serves a large number of customers must be found by the person or persons in the accounting department who may be assisted by the cashier if the errors are hard to find. If the cashier were in a position to obtain the balance slip before he hands over the cash receipts, he could adjust the sum total of cash receipts to conceal his errors or to fraudulently hide a certain percentage of the daily take.

The abovedescribed conventional procedure of controlling the cashiers possesses a number of serious drawbacks. Thus, additional personnel must be employed to go from cash register to cash register and to collect the balance slips after the cashiers are gone and after the establishment is closed or before the next cashier in charge of the same cash register can begin his daily shift. If the balance slips are collected at the end of a working day, this means that additional electric current is consumed for lighting the establishment, not counting the wages of the personnel in charge of collecting the balance slips and of restoring to zero the counter mechanisms of the cash registers. On the other hand, if the balance slips are collected between two successive shifts, there is an interruption in the use of cash registers to the annoyance of customers.

Furthermore, the cashier who has handed over his cash receipts and his sales report does not know until the next day or to a later date whether or not the balance slip indicates an amount which corresponds to the sum total of cash receipts. This not only constitutes a psychological drawback but may also arouse the suspicion of the cashier if he is informed of discrepancies at a later date. Also, the cashier is not likely to remember the events of the preceding day or the events which occurred two or more days ago so that he is of little, if any, assistance to the employees in the accounting department who must find the errors. Even though the supervisors and other personnel in an accounting department are usually trustworthy and bonded employees, it is unavoidable that the announcement of errors at a later date causes dissatisfaction, rumors and dissension among the cashiers. Furthermore, a cashier would feel much more secure if he were to know that he himself obtained the balance slip and if he would be able to learn the figure on the balance slip even though he were prevented from altering the sum total of his daily cash receipts.

Accordingly, it is an important object of the present invention to provide a receptacle or portable safe which is constructed and assembled in such a way that it may be handed to the cashier in a condition in which it may receive the daily cash receipts, and that it may also contain or support the Z key so that the cashier may obtain the balance slip at a time when he has already deposited the cash receipts in the receptacle and does not have access to the cash receipts even though he knows what the sum total of the cash receipts is. Consequently, the cashier will be immediately aware that there does or does not exist a discrepancy between the sum total of cash receipts and the figure on the balance slip which enables him to recapitulate the events of that particular day or shift in order to rapidly determine the reasons for such discrepancies at a time the events are still fresh in his memory.

Another object of the invention is to provide a receptacle of the just outlined characteristics which enables the cashier or salesman-cashier to restore to zero and to obtain a balance slip from the cash register of which he was in charge so that the task of supervisory personnel consists solely in counting the cash receipts and in determining the source of errors with the assistance of the cashier who was alerted that errors do exist and therefore remembers all possible causes of such errors.

A further object of the invention is to provide a receptacle for the Z key and for the daily cash receipts removed from a cash register which is constructed and assembled in such a way that, while the cashier may alternately obtain access to the chamber for the cash receipts and to the depository for the Z key, he cannot reach the Z key if he is free to reach the cash receipts, and that the cashier can obtain the Z key only at a time when the cash receipts are already locked in the chamber of the receptacle in a manner preventing the cashier from tampering with the cash so that only a sworn and bonded supervisor may remove the cash receipts from the receptacle.

An additional object of the invention is to provide a receptacle of the above outlined characteristics which enables the cashier to obtain a balance slip immediately after depositing the cash receipts so that the cashier need not bother to write a sales report, particularly if he has determined that the sum total of cash receipts matches the figure indicated on the balance slip.

Still another object of the invention is to provide a very simple, inexpensive and compact mechanism which may be utilized in a receptacle of the above outlined characteristics for selectively locking the depository for the Z key and the chamber for the cash receipts to prevent fraudulent adjustments in the sum total of cash receipts.

A concomitant object of the invention is to provide a method of collecting daily cash receipts and of obtaining balance slips from cash registers by simultaneous prevention of fraudulent manipulation of cash receipts by the personnel in charge of collecting cash receipts from the customers.

Still another object of my invention is to provide a method of the just outlined characteristics which brings about substantial savings in personnel and in expenses for lighting of commercial establishments utilizing a large number of cash registers, which simplifies the task of the accounting personnel in such establishments, and which also simplifies the task of cashiers by adding to their feeling of security and by enabling them to recall the events which might have led to errors and discrepancies at a time when such events are still fresh in their minds.

With the above objects in view, the invention resides in the provision of a method of collecting cash receipts in the lockable chamber of a receptacle having a depository for blocking access to or for unblocking an actuating member or Z key which is utilized for obtaining a balance slip from a cash register. This method comprises opening the chamber of the receptacle so that the cash receipts contained in the register may be transferred into the chamber, blocking removal of the actuating member from its depository by the opening of the chamber so that a person who is in charge of inserting cash receipts into the chamber cannot remove the actuating member from its depository in order to obtain the balance slip before the cash receipts are inserted into and locked in the chamber, locking the chamber and simultaneously unblocking the actuating member by the locking of the chamber so as to provide access to the depository whereby the actuating member may be withdrawn to obtain the balance slip from the cash register at a time the cash receipts are already locked in the chamber, and again placing the actuating member into the depository. It is preferred to place the balance slip into the depository or to provide means permitting insertion of the balance slip into the chamber without, however, permitting removal of cash receipts from the latter.

The receptacle which is utilized in the practice of my method comprises a closable and lockable chamber for the cash receipts, closure means for the chamber (e.g. a door, a zipper, a pivotable frame member, a cover or the like) movable between chamber closing and opening positions, means (such as a key-operated locking device) for locking and unlocking the closure means, a depository (e.g. a pair of stirrups or a suitable chamber) for the actuating member having a blocking position and an unblocking position; and operating means (preferably in the form of a mechanism including one or more bolts) for interconnecting the locking means and the depository in such a way that the depository is automatically maintained in blocking position when the closing means is in opening position and that the depository is automatically unblocked when the locking means locks the closing means in closing position whereby the receipts contained in the chamber are not accessible to a person having access to the actuating member.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 1 is a perspective view of a receptacle which embodies one form of my invention, the cover of the receptacle being shown in open position so that the cashier may place the daily cash receipts into the internal chamber of the receptacle prior to moving the cover to its closed position and prior to removal of the Z-key which latter is normally locked in its depository at the outer side of the cover;

FIG. 5 is a further top plan view of the cover with the lid removed, showing the mechanism in a position in which the Z key is removable from its depository;

FIG. 6 is a similar top plan view of the cover with the mechanism in a position it assumes when the chamber is locked and the Z-key is again secured to its depository at the outer side of the cover;

FIG. 7 is a perspective view of a modified receptacle wherein the depository for the Z key assumes the form of a chamber and wherein the contents of both chambers may be locked by pivotable doors;

FIG. 9 is a perspective view of a different receptacle wherein the depository for the Z key again assumes the shape of a chamber and wherein the contents of the two chambers may be locked by a pair of U-shaped frame members;

FIG. 11 is a fragmentary perspective view of a receptacle which constitutes a modification of the receptacle shown in FIG. 9;

FIG. 12 is a perspective view of a further embodiment of my invention wherein the receptacle is provided with a slidable plate-like cover adapted to alternately expose a pair of chambers respectively accommodating the Z key and the cash receipts;

FIG. 13 is an enlarged axial section through a locking device forming part of the receptacle shown in FIG. 12;

FIG. 14 is an enlarged longitudinal section through the frame, through the cover and through the locking device of the receptacle shown in FIG. 12, the cover being shown in a position it assumes when the chamber for the cash receipts is partly exposed and the section of FIG. 14 being taken along the line XIV—XIV of FIG. 12, as seen in the direction of arrows;

FIG. 15 shows the structure of FIG. 14 in a position in which the cover fully exposes the chamber for the cash receipts;

FIG. 16 illustrates the structure of FIGS. 14 and 15 in a position in which the chamber for the cash receipts is locked but the cashier is free to remove the Z key from the other chamber;

FIG. 17 illustrates the structure of FIGS. 14–16 with the cover in a position in which it seals both chambers of the receptacle; and FIG. 18 illustrates a modified locking device for the receptacle of FIG. 12.

Figure 2:
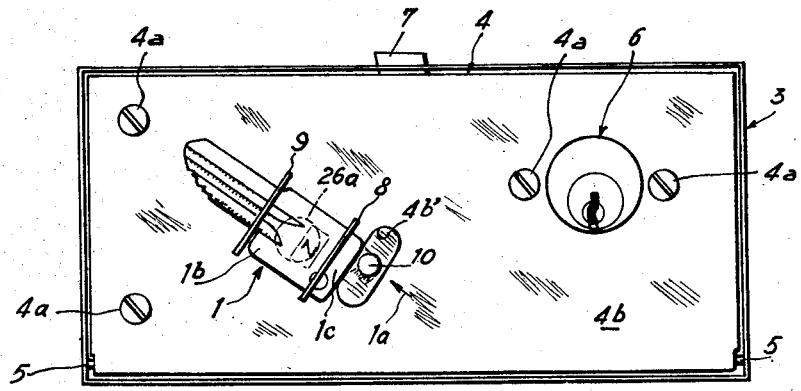
FIG. 2 is a top plan view of the cover, again showing the Z-key in locked position.
Figure 1:
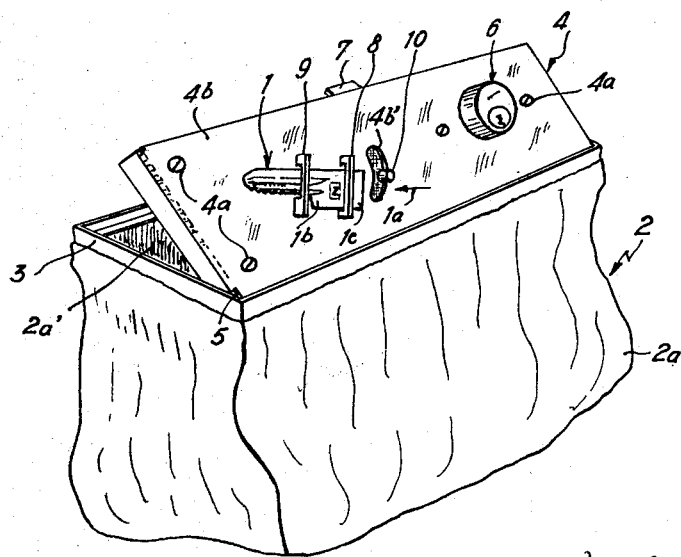

Referring now in greater detail to the illustrated embodiments, and first to FIGS. 1 and 2, there is shown a receptacle 2 for the daily cash and other receipts in a supermarket or a similar institution: This receptacle is provided with means for normally locking a Z key 1 in a depository at the outer side of a closing means here shown as a composite cover or casing 4. The receptacle 2 comprises a flexible bag like lower portion 2a, a rectangular frame 3 which is secured to the edges bounding the open end of the bag 2a, and the aforementioned composite cover or casing 4 which is hinged to the frame 3, as at 5, and which is movable between the open position of FIG. 1 and the closed position of FIG. 2. In the open position of FIG. 1, a cashier or a salesman-cashier may introduce the daily receipts (i.e. cash, checks, vouchers, etc.) into the closable and lockable chamber 2a' of the bag 2a and thereupon closes the receptacle by pivoting the cover 4 to the position of FIG. 2 in order that he may subsequently release the Z key 1 which latter enables him to operate the cash register with a view to obtain a balance ticket or slip listing the exact sum total of his daily receipts which should equal the sum total of receipts placed into the chamber 2a' of the receptacle. The arrangement is such that the cashier cannot remove the Z key 1 unless he has already pivoted the cover 4 to the position of FIG. 2 and unless he has already locked the cover to the frame 3 so that he cannot have simultaneous access to the daily receipts and to the Z key. In other words, the possibility of determining whether or not the sum total of daily cash or other negotiable receipts corresponds to the amount indicated on the balance slip obtainable with the help of the key 1 prior to insertion and locking of daily receipts into the bag 2a is completely eliminated because the key 1 can be separated from the cover 4 only after the negotiable receipts are already locked in the receptacle.

The key 25 (see FIG. 3) which is necessary to reopen the receptacle 2 in order to provide access to the balance slip and cash receipts therein is not available to the cashier so that, and provided that the cashier decided to count the daily receipts prior to placing the same into the bag 2a, he may determine whether or not the balance slip indicates a figure which equals the sum total of his daily receipts but he cannot have access to the daily receipts once he has access to the balance slip. In other words, if the cashier desires, he may learn of any discrepancies between the sum total of daily receipts and the amount indicated by the balance slip obtainable with the Z key 1, and he may spend his free time thinking as to where and why the discrepancy arose, but he cannot fraudulently change the sum total of receipts to correspond to the amount indicated by the balance slip.

The mechanism which selectively releases the Z key 1 and which selectively locks the cover 4 to the frame 3 is mounted in part on and in part in the internal compartment 4d formed between the top plate or lid 4b and the bottom plate 4c of the cover 4. The lid 4b is secured to the bottom plate 4c by a series of screws 4a or in another suitable way.

FIGS. 3 to 6 illustrate the mechanism installed in the compartment 4d to serve the dual function of releasably blocking the Z key 1 in a depository here shown as including a pair of retaining members or stirrups 8, 9 and of selectively bolting the cover 4 to the frame 3. The stirrups 8, 9 are secured to the outer side of the lid 4b and are arranged in such a way that the key 1 may be inserted therein in the direction indicated by the arrow 1a, i.e. first through the stirrup 8 and thereupon through the stirrup 9. In the position of FIGS. 1 and 2, a shoulder 1b of the key 1 abuts against the stirrup 9 and a blocking pin or stud 10 is shifted to a position rearwardly of the rearmost or handgrip portion 1c of the key 1 so that the latter cannot be withdrawn from its depository 8, 9 unless the stud 10 is pivoted from its path to the position shown in FIG. 5. The stud 10 extends through an arcuate slot 4b' provided in the lid 4b. Intermediate the stirrups 8, 9, the lid 4b is formed with a circular or otherwise configurated aperture 26a which is aligned with a similar aperture 26 in the bottom plate 4c, these apertures serving as a means for permitting the introduction of a balance slip into the bag 2a when the key 1 is removed from its depository. The aperture 26a is shown in broken lines in FIG. 2, and it will be noted that this aperture is concealed by the key 1 when the latter is secured to the lid 4b.

Figure 3:
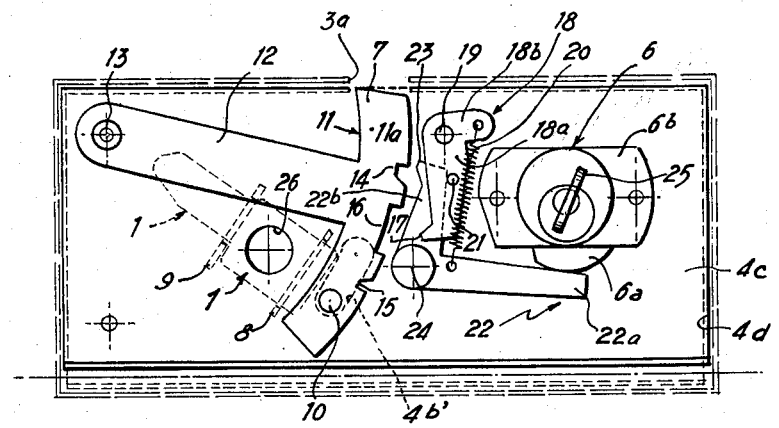
FIG. 3 is a top plan view of the cover with the latter's lid removed to reveal the key-blocking and chamber-locking mechanism in unlocked position.

Referring now to FIG. 3, the aforementioned mechanism for releasably blocking the key 1 comprises a substantially T-shaped lever 11 having a shank 12 whose free or rear end is turnable about a pivot member 13 secured to the bottom plate 4c. The flat arcuate head 11a of the lever 11 is pivotable in its own plane in directions indicated by the arrows $F_1$ and $F_2$ (FIG. 4) and its end portion 7 which is distant from the hinge 5 constitutes a bolt for locking the cover 4 to the frame 3. The frame is formed with a slot 3a through which the bolt 7 may extend when the cover 4 assumes the position of FIG. 2 and the lever 11 is pivoted in the direction indicated by the arrow $F_2$. The other end portion of the head 11a carries the aforementioned stud 10 so that the movements of the level 11 about the pin 13 are limited by the dimensions of the slot 4b' in the lid 4b. The slot 4b', the key 1 and the stirrups 8, 9 are shown in phantom lines in FIGS. 3–6 because it is assumed that the lid 4b is removed.

The convex outer edge portion of the head 11a is formed with three spaced notches 14, 15, 16, the latter located between the notches 14, 15 and bounded by a pair of substantially radial walls. The notch 14 is bounded by a radial outer wall adjacent to the bolt 7 and by an inclined wall which tapers outwardly and toward the central notch 16. The notch 15 is bounded by a radially extending outer wall adjacent to the stud 10 and by an inclined inner wall which tapers outwardly and toward the central notch 16.

The lever 11 cooperates with two pawls 18, 22 which are respectively rockable about pivot pins 19, 24 secured to the base plate 4c. The pallets 17, 23 of the respective pawls 18, 22 may selectively enter the aforementioned notches 14–16 in order to releasably or non-releasably block the lever 11 in a series of different angular positions.

The means for operating the pawls 18, 22 comprises a locking device 6 of any suitable design whose housing 6b is mounted on the base plate 4c and which partially extends through a cutout of the lid 4b so as to have its key slot accessible to a supervisor who is in charge of removing the daily receipts and the balance slip from the bag 2a. The locking device 6 is actuatable by the aforementioned key 25 (shown in FIG. 3) which is in possession of the supervisor and is not available to the cashier, the purpose of the key 25 being to move the mechanism to the position of FIG. 3 in which the bolt 7 is withdrawn from the slot 3a so that the cover 4 may be pivoted to the position of FIG. 1. All a supervisor has to do is to insert the key 25 into the slot of the locking device 6 and to turn the key in order to expel the tongue or bolt 6a from the housing 6b whereby the tongue 6a engages one arm 22a of the pawl 22 and pivots the latter about the pin 24 in clockwise direction, as viewed in FIG. 3. Such clockwise rotation of the pawl 22 causes the pallet 23 to move away from the head 11a, and the other arm 22b of the pawl 22 simultaneously engages a motion transmitting pin 21 on the arm 18a of the pawl 18 so that the latter is caused to pivot in anticlockwise direction about the pin 19 and moves its pallet 17 away from the head 11a. In other words, the tongue 6a of the locking device 6 causes the pawls 18, 22 to respectively pivot in opposite directions about the pivot pins 19, 24 and to thereby retract the respective pallets 17, 23 from engagement with the lever 11. It will be noted that the pawls 18, 22 are resiliently coupled by a biasing means in the form of a helical spring 20 which is connected to the arm 22a of the pawl 22 and to the arm 18b of the pawl 18. This spring 20 always tends to pivot the pawl 18 in clockwise direction and to pivot the pawl 22 in anticlockwise direction in order to move the pallets 17, 23 into engagement with the head 11a of the lever 11.

Figure 4:
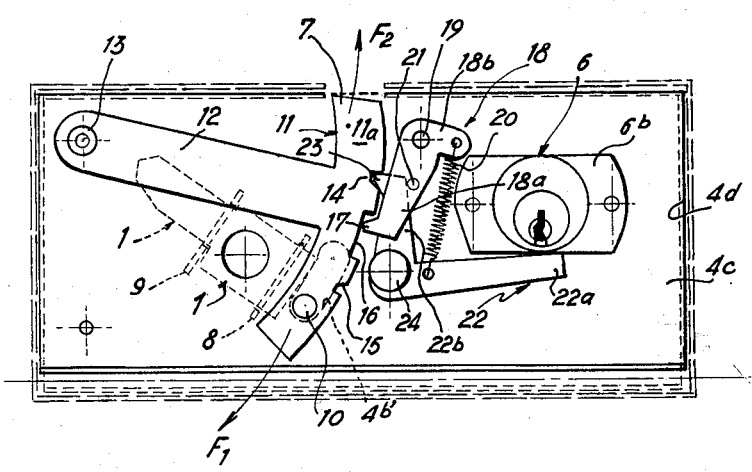
FIG. 4 is a similar top plan view of the cover but showing the mechanism in a different position in which it may be operated by the cashier to unlock the Z key.

It is assumed that, prior to insertion of the key 25 into the slot of the locking device 6, the lever 11 takes the position of FIG. 6 in which the bolt 7 extends into the slot 3a and thereby locks the cover 4 to the frame 3. After turning the key 25 to expel the tongue 6a from the housing 6b, the supervisor grasps the stud 10 and moves the lever 11 to the position of FIG. 3. The pallets 17, 23 cannot obstruct such movement of the stud 10 because the tongue 6a engages with the arm 22a of the pawl 22 and thereby holds the pallets away from the head 11a. The supervisor then withdraws the key 25 from the locking device 6 whereby the spring 20 compels the pawls 18, 22 to assume the position of FIG. 4 in which the pallet 23 extends into the notch 14 and the pallet 17 projects into the central notch 16. The width of the central notch 16 exceeds substantially the width of a pallet 17 or 23 so that this notch may simultaneously accommodate both pallets (see FIG. 6). Once the pawls 18, 22 and the lever 11 assume the position of FIG. 4, the receptacle 2 is handed over or sent to the cashier who keeps it until after his shift is completed and until after he inserts the daily receipts into the chamber 2a' of the bag 2a followed by the balance slip which latter is introduced through the aligned apertures 26a, 26. It will be noted that FIG. 4 shows the lever 11 in a position in which this lever may be pivoted in the direction of the arrow $F_2$ so as to move the bolt 7 into the slot 3a, but that the lever 11 cannot be pivoted in the direction of the arrow $F_1$ because the radial outer wall of the notch 14 engages with the similarly inclined end face of the pallet 23 and also because the stud 10 abuts against the outer end wall of the slot 4b'. However, since the inner wall of the notch 14 is inclined toward the central notch 16, the cashier can pivot the lever 11 in the direction of the arrow $F_2$ after overcoming the bias of the spring 20 which tends to maintain the pallet 23 in the notch 14. In order to pivot the lever 11, the cashier grasps the stud 10 and, after pivoting the cover 4 to the position of FIG. 2 (i.e. after having inserted the daily receipts into the bag 2a), he moves the stud 10 in the direction of the arrow $F_2$ and into the position of FIG. 5 in which the stud 10 is shifted away from the rear portion 1c of the key 1 so that the latter may be withdrawn from the depository 8, 9 and may be utilized to obtain the balance slip from the cash register and to reset to zero the counter mechanism. After introducing the balance slip through the apertures 26a, 26, the cashier reinserts the key 1 into the depository 8, 9 and thereupon shifts the stud 10 back to the position of FIG. 6 to lock the Z key in place without, however, unlocking the cover 4 which remains secured to the frame 3.

While moving the stud 10 from the position of FIG. 4 into the position of FIG. 5, the cashier causes the pallet 23 to slide along the inclined inner wall of the notch 14 whereby the arm 22b of the pawl 22 engages the motion transmitting pin 21 and pivots the pawl 18 in anticlockwise direction so that the pallet 17 is withdrawn from the central notch 16 to enter the notch 15 at the time the pallet 23 extends into or is adjacent to the central notch 16. The spring 20 compels the arm 22a of the pawl 22 to move into abutment with the lock housing 6b whenever the tongue 6a is withdrawn into the housing, excepting when the cashier shifts the stud 10 between the positions of FIGS. 4, 5 or 5, 6.

While shifting the blocking stud 10 from the position of FIG. 5 to that of FIG. 6, the cashier overcomes the bias of the spring 20 by causing the pallet 17 to slide along the inclined inner wall of the notch 15 and toward the central notch 16. In the position of FIG. 6, the pallets 17, 23 engage with the radial walls of the central notch 16 and thereby lock the lever 11 in a position in which the bolt 7 still extends into the slot 3a to prevent the cover 4 from moving to the open position of FIG. 1 and to simultaneously prevent (by its stud 10) removal of the Z key 1 from its depository 8, 9.

It is preferred to mount the lever 11 in such a way that it automatically remains in the position of FIG. 3 as soon as the tongue 6a is expelled from the lock housing 6b and as soon as the cover 4 is pivoted to the open position of FIG. 1, i.e. the lever 11 may pivot by gravity about its pin 13 as soon as it is disengaged from the pallets 17 and 23. If the key 25 is thereupon withdrawn from the locking device 6 (FIG. 4), the spring 20 automatically compels the pallet 23 to enter the notch 14 and to thereby prevent unintentional movement of the lever 11 to the position of FIG. 5, such movement of the lever being thereupon brought about by the cashier after insertion of cash receipts into the bag 2a and after pivoting the cover 4 back to the position of FIG. 2.

The supervisor receives the receptacle when the mechanism is in the position of FIG. 6. All he has to do in order to obtain access to the receipts in the bag 2a is to insert the key 25 and to turn this key so as to expel the tongue 6a into engagement with the arm 22a of the pawl 22. The pawl 22 then pivots the other pawl 18, and the pallets 17, 23 are withdrawn to the position of FIG. 3 to release the lever 11 which then moves to the position of FIG. 3 as soon as the supervisor shifts the stud 10 in the direction of the arrow $F_1$.

The bag 2a may be provided with the name of the cashier or with the number of the respective cash register. This bag may be handed to the cashier in the morning or at any time during the day before closing or before the shift ends.

As can be determined from the above description of FIGS. 1 to 6, the lever 11 may assume an unlocked position (FIG. 3) under the action of the key 25 and tongue 6a, a fully locked position (FIG. 6) under the action of the spring 20, a first semilocked position (FIG. 4) under the action of the spring 20, and a second semilocked position (FIG. 4) again under the action of the spring 20. The difference between the two semilocked positions is that the lever 11 cannot move in the direction of the arrow $F_1$ when in the position of FIG. 4, and that it cannot move in the direction of the arrow $F_2$ when in the position of FIG. 5. In fact, the outer notches 14, 15 are not necessary to respectively limit movements of the lever 11 in the direction of the arrows $F_1$ and $F_2$ (since this can be and is accomplished by the walls bounding the slot 4b') but mainly to provide inclined walls which guide the pallets 17, 23 into the central notch 16 so that the pallets may assume the position of FIG. 6.

The exact construction of the locking device 6 forms no part of this invention. This device is preferably constructed in such a way that a spring therein automatically retracts the tongue 6a into the housing 6b when the supervisor's key 25 is withdrawn.

FIG. 7 illustrates a modified receptacle 27 which assumes the shape of a rigid box having two internal chambers 28, 29 separated by a partition 30. The closable and lockable chamber 28 serves as a means for accommodating the daily receipts, whereas the smaller chamber 29 serves as a depository for the Z key (not shown) and for the balance slip. The open upper ends of the chambers 28, 29 may be respectively closed by closing means in the form of doors 31, 32 which are hinged to the upstanding shorter side walls of the receptacle 27 so as to move their bolt-receiving means or catches 31a, 32a toward and away from a cover or casing 33 disposed therebetween and located above the partition 30. It will be seen that the cover 33 and the hinged doors 31, 32 together constitute a composite top wall of the receptacle 27 and that, while the cover 33 is permanently secured to the upstanding longer side walls of the receptacle, the two doors may pivot between the open positions of FIG. 7 and the closed positions in which they are coplanar with the cover 33.

Figure 8:
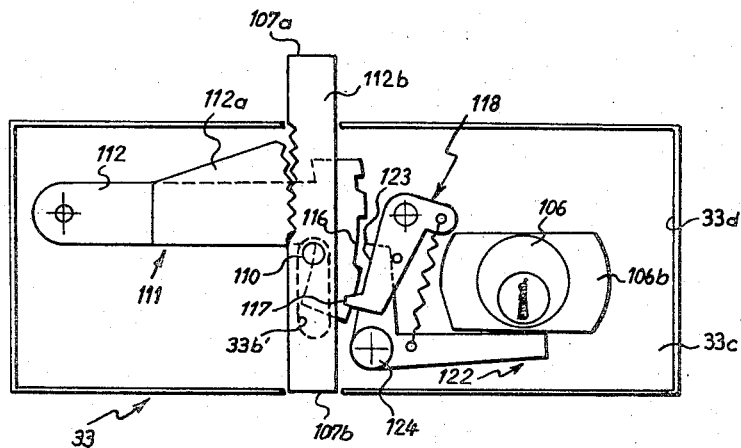
FIG. 8 is a top plan view of a locking mechanism which is installed in a casing forming part of the receptacle shown in FIG. 7.

The cover 33 corresponds to the cover 4 and, as shown in FIG. 8, its internal compartment 33d accommodates a slightly modified locking mechanism adapted to selectively or simultaneously lock the doors 31, 32 in closed position. It is assumed in FIG. 8 that the top plate or lid 33b of the cover 33 is removed and that the mechanism is in a position it assumes when the receptacle 27 is in the hands of a cashier who is about to lock the Z key and the balance slip in the depository 29.

The lid 33b of the cover 33 is formed with an elongated slot 33b' for the blocking stud 110 and with a suitable cutout for a portion of the locking device 106 whose key slot may receive a key corresponding to the key 25 shown in FIG. 3. The locking device 106 comprises a housing 106b which is secured to the bottom plate 33c of the cover 33, and a non-illustrated tongue which corresponds to the tongue 6a of FIG. 3. The mounting of the pawls 118, 122 and of the lever 111 on the bottom plate 33c is the same as described in connection with FIGS. 3 to 6. The shank 112 of the lever 111 is connected with a toothed segment or gear 112a which meshes with an elongated toothed rack 112b having two end portions or bolts 107a, 107b respectively adapted to engage with the catches 31a, 32a of the doors 31, 32 so as to selectively lock these doors to the cover 33.

The mechanism of FIG. 8 operates as follows:

When the supervisor receives the receptacle 27 from a cashier, the daily receipts are contained in the larger chamber 28. The smaller chamber or depository 29 contains the Z key and the balance slip, and the doors 31, 32 are locked because the pallets 117, 123 extend into the central notch 116 and the bolts 107a, 107b respectively project into the catches 31a, 32a.

The supervisor then inserts his key (corresponding to the key 25 of FIG. 3) into the slot of the locking device 106 and expels the tongue of this locking device from the housing 106b so as to pivot the pawl 122 about the pin 124 and to thereby withdraw the pallets 117, 123 from the central notch 116. Such position of the locking mechanism corresponds to that of the mechanism shown in FIG. 3, i.e. the supervisor can now engage the stud 110 so as to move the rack 112b first to the full-line position of FIG. 7 or 8 in order to release the door 32, and thereupon to the other end position (not shown) in order to release the door 31. Since the two doors are now unlocked, the supervisor may remove the daily receipts from the chamber 28 and he is also free to remove the balance slip from the depository 29. The Z key may remain in the depository since the supervisor need not operate the cash register at any time, such operation of the cash register being performed by the cashier or salesman-cashier at the end of his or her daily shift.

In the next step, the supervisor pivots the door 32 to its closed position and thereupon withdraws his key from the slot of the locking device 106. Before withdrawing the key, the supervisor shifts the stud 110 to the center of the slot 33b' so as to move the rack 112b to and beyond the phantom-line position of FIG. 7 and to lock the door 32 to the cover 33 whereas the other door 31 remains unlocked. The receptacle 27 is thereupon handed over or sent to the cashier who may place the daily receipts into the chamber 28. Once the receipts are deposited in the chamber 28, the cashier pivots the door 31 to the position of alignment with the cover 33 and shifts the stud 110 in order to move the rack 112b to the full-line position of FIG. 7 whereby the bolt 107a engages with the catch 31a and prevents access to the chamber 28. In such position of the rack 112b, the mechanism in the cover 33 assumes a position corresponding to that of the mechanism shown in FIG. 5, namely, the door 32 is now unlocked so that the cashier may remove the Z key from the depository 29. After obtaining the balance slip from the register, the cashier places the balance slip and the Z key into the depository and shifts the stud 110 substantially midway between the longitudinal ends of the slot 33b', i.e. to move the rack 112b to the broken-line position of FIG. 7, whereby the pallets 117 and 123 enter the central notch 116 and positively lock the doors 31, 32 to the cover 33. The receptacle 27 is now ready to be delivered to the supervisor who utilizes his own key to actuate the locking device 106 and to withdraw the pallets 117—123 from the central notch 116.

Since the stud 110 is rigid with the rack 112b, and since the rack is in permanent meshing engagement with the segment 112a, any movements imparted to the stud 110 are necessarily transmitted to the lever 111 and to the pawls 118, 122.

Referring to FIG. 9, there is shown a modified receptacle 36 which comprises a flexible lower portion or bag 36a having an opening bounded by a pair of closing means in the form of substantially U-shaped frame members 36b, 36c. The ends of the frame members are pivoted to a similar median frame member 37 which is secured to a flexible partition 37a, the latter dividing the interior of the receptacle 36 into a pair of elongated chambers 34, 35. The frame members 36b, 36c are respectively provided with upwardly extending lugs 36d, 36e, and each of these lugs comprises an inwardly extending eye or catch 34a, 35a, these catches respectively corresponding to the catches 31a, 32a shown in FIG. 7. The closable and lockable chamber 35 is intended to receive the daily receipts (such as cash, checks, vouchers, etc.), and the other chamber 34 serves as a depository for the Z key and for the balance slip.

Figure 10:
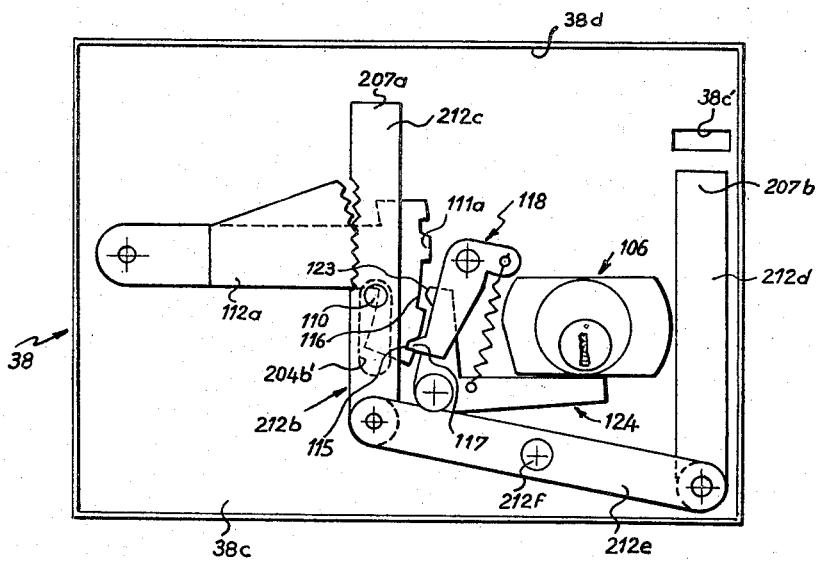
FIG. 10 is a top plan view of a locking mechanism installed in a casing forming part of the receptacle shown in FIG. 9.

The median frame member 37 is rigidly connected with a substantially rectangular casing 38 which performs the function of the cover or casing 33 shown in FIG. 8 and which is illustrated, with its front wall 38a removed, in FIG. 10.

The bottom plate or rear wall 38c of the casing 38 is formed with a slot 38c' for the catch 34a of the frame member 36b, and a similar slot 38a' is provided in the front wall 38a to receive the catch 35a of the frame member 36c. The mechanism in the internal compartment 38d of the casing 38 is practically identical with the one described in connection with FIG. 8 and, therefore, the reference numerals utilized in FIGS. 8 and 10 are the same with the exception of the numeral 212b which denotes a composite toothed rack analogous to the aforedescribed rack 112b. The rack 212b comprises a toothed first bar or strip 212c which meshes with the segment 112a and whose free end portion 207a constitutes a bolt adapted to enter the catch 35a when the latter extends through the slot 38a' and into the compartment 38d, a second strip or bar 212d which is parallel with but spaced from the bar 212c and whose free end portion 207b constitutes a bolt adapted to engage the catch 34a when the latter extends through the slot 38c', and a connecting element in the form of a two-armed lever 212e which is pivotally mounted on a pin 212f secured to the rear wall 38c and whose ends are articulately connected to the adjacent ends of the strips 212c, 212d. The strip 212c carries the blocking pin 110 which projects through an elongated guide slot 204b' in the front wall 38a.

The position of the mechanism contained in the casing 38 and shown in FIG. 10 corresponds to that of the mechanism shown in FIG. 5, i.e. the cashier has already inserted the daily cash receipts into the chamber 35 and has thereupon shifted the pin 110 to the end position of FIG. 10 after having introduced the catch 35a into the slot 38a'. The pallet 117 of the pawl 118 extends into the outer notch 115. The catch 35a is now engaged by the bolt 207a and the receipts are not accessible to the cashier. However, since the bolt 207b is moved away from the slot 38c', the cashier is free to pivot the frame member 36b to the position of FIG. 9 and to withdraw the Z key which is assumed to be located in the depository 34. In the next step, the cashier utilizes the Z key to obtain the balance slip from the cash register and thereupon places the balance slip and the Z key into the depository 34. In the final step, the cashier introduces the catch 34a into the slot 38c' and moves the pin 110 substantially midway between the ends of the slot 204b' so as to move the pallets 117, 123 into the central notch 116 of the head 111a. In such position of the head 111a and hence of the strips 212c, 212d, the bolts 207a, 207b respectively engage with the catches 35a, 34a and lock the frame members 36b, 36c to the casing 38 which means that the contents of the chamber 35 and of the depository 34 are accessible only to the supervisor who is in possession of the key for the locking device 106.

FIG. 11 illustrates a further modification of the invention which is embodied in a receptacle in the form of a hand bag 39 similar to the bag 36 of FIG. 9. The interior of the receptacle 39 is divided into a closable and lockable larger chamber which occupies the major part of the receptacle and a smaller chamber or depository 40 which is indicated in broken lines. The large chamber is intended to accommodate the daily cash receipts and is sealable by a closing means in the form of a zipper 41A and a slider 41, the latter combined with a handgrip member 41a having at its end remote from the slider 41 an aperature 41b so that the handgrip member actually constitutes a catch analogous to the catch 35a of FIG. 9. The depository 40 may be sealed by a zipper 42A and by a slider 42 which latter is provided with a handgrip member or catch 42a having an aperture 42b. The handgrip member 42a corresponds to the catch 34a of FIG. 9.

The central portion of the receptacle 39 carries a casing 338 which is analogous to the casing 38 of FIG. 9 and which contains a mechanism substantially identical with the mechanism shown in FIG. 10. The only difference is that the slots corresponding to the slots 38a', 38c' of FIGS. 9 and 10 are provided in the opposed vertical end walls of the casing 338 so that these slots may respectively receive the catches 41a, 42a when the sliders 41, 42 are moved toward the casing so as to seal the chamber and the depository of the receptacle 39. Only the slot 338a' for the catch 41a is shown in FIG. 11. The mechanism in the casing 338 again comprises a composite toothed rack 212b whose strips may respectively engage the catches 41a, 42a to prevent access to the chamber and to the depository once the cash receipts, the Z key and the balance slip are placed therein, to provide access to the larger chamber for insertion of cash receipts at the time when the depository 40 is sealed by the zipper 42A, or to provide access to the depository 40 at the time the larger chamber and the cash receipts accommodated therein are sealed by the zipper 41A.

FIGS. 12 to 17 illustrate an additional embodiment of the invention. Referring first to FIG. 12, there is shown a receptacle 44 which comprises a flexible lower portion or bag 44a having an open end connected to a rectangular frame 45. The interior of the bag 44a defines a closable and lockable chamber 48 which accommodates the cash receipts, and the frame 45 defines a smaller chamber or depository 47 which is intended for reception of the Z key 1 (see FIGS. 14, 15 and 17) and of the balance slip (not shown).

The two longitudinally extending portions of the frame 45 are parallel with each other and are provided with outwardly extending flanges 45a, 45b, the latter constituting guide rails for the inwardly turned channel-shaped longitudinal edge portions 46a, 46b of a closing means in the form of a plate-like cover 46 so that the latter is slidable in the longitudinal direction of the frame 45 from the position of FIG. 17 to the position of FIG. 14, thereupon to the position of FIGS. 15 and 16, and finally back to the position of FIG. 17. The underside of the cover 46 is substantially flush with the upper face of the frame 45, and the latter accommodates a locking device 49 which by itself performs the function of the blocking pin and of the mechanism shown in FIGS. 3–6, in FIG. 8 or FIG. 10. The locking device 49 is located at the outer side of the depository 47 and is mounted in a transverse component 52 of the frame 45, this component 52 constituting the housing of a preferably cylindrical barrel 51 having a slot 51b for the supervisor's digital key 50, the latter corresponding to the key 25 shown in FIG. 3.

A small bulge has been provided, as shown at 46c in FIGS. 12 and 14 to 17, at the middle point of the smaller edge of the cover 46 which is nearer the barrel 51. A narrow slot 46d has been made in said bulge along the longitudinal axis of the cover. This slot registers with the slot 51b, so that the digital key 50 may enter the slot 51b passing through the slot 46d.

The exact construction of the locking device 49 is shown in FIG. 13. The barrel 51 is axially movably guided by a spherical detent element 54 which may partially extend into a peripheral groove 57 of the barrel, this groove having two enlarged concave end portions 56, 56a constituting seats for the detent element 54 in the two end positions of the barrel 51. When the detent element 54 is received in the seat 56, the barrel 51 assumes its innermost or depressed position shown in FIGS. 14 and 15. On the other hand, when the detent element 54 projects into the seat 56a, the barrel 51 assumes the outermost or extended position of FIGS. 12–13 and 16–17. When received in the seat 56, the detent element 54 also serves as a means for preventing the barrel 51 from moving inwardly and beyond the position of FIGS. 14 and 15. As shown in FIGS. 13–17, the barrel 51 is axially movable in a bore 52a provided in the housing 52 and this bore accommodates an expansion spring 51a which permanently biases the barrel to the extended position of FIG. 13 in which the detent element 54 is received in the seat 56a.

The key 50 need not rotate the barrel 51 but is merely utilized to operate a series of tumblers 53 and countertumblers 53a which latter, when properly engaged by the serrated beard or web 58 of the key 50, permit the barrel to move to the position of FIGS. 14 and 15 if the supervisor overcomes the bias of the spring 51a. The tumblers 53 and the countertumblers 53a are under the bias of springs 67 and are reciprocably received in radial bores 65, 66 respectively provided in the barrel 51 and in the housing 52. The bores 65, 66 are aligned with each other when the barrel 51 assumes the extended position of FIG. 13 so that the springs 67 may force the countertumblers 53a to extend partly into the bores 65 and partly into the bores 66 whereby the countertumblers lock the barrel in the position of FIG. 13 until the supervisor inserts the key 50 to engage the tumblers 53 and to move these tumblers radially outwardly to the extent necessary to move the countertumblers 53a back into the bores 66 against the bias of the respective springs 67. If the supervisor then continues to press the key 50 into the slot 51b, the barrel 51 begins to descend into the bore 52a against the bias of the spring 51a until the outer end face of the barrel 51 is flush with the end face of the housing 52, i.e. with the upper face of the frame 45 (FIGS. 14 and 15). In the next step, the supervisor shifts the cover 46 to the right, as viewed in FIG. 12 so that the front edge portion of the cover engages the outer end face of the barrel 51 and maintains the latter in depressed position against the bias of the spring 51a. The key 50 is then withdrawn and the receptacle 44 may be handed over or sent to the cashier. The withdrawal of the key 50 in depressed position of the barrel 51 is made possible by a retaining plate 52b which is received in a radial cutout 52c of the housing 52 and which is biased by one or more springs 68 in a direction toward the periphery of the barrel 51. The springs 67, 68 are retained by a second plate 52d which is secured to the outer side of the housing 52 and seals the bores 66 as well as the cutout 52c. When the web 58 of the key 50 has expelled the countertumblers 53a from the bores 65 into the bores 66, and when the barrel 51 is moved to its depressed position of FIGS. 14 and 15, the outer ends of the tumblers 53 bear against the spring-biased retaining plate 52b. All the supervisor has to do is to pull the key 50 in outward direction, i.e. to the left as viewed in FIG. 13, whereby the web 58 causes the tumblers 53 to move the plate 52b into the cutout 52c and against the bias of the spring or springs 68 so that the key may be withdrawn from the slot 51b. Once the key is withdrawn, the plate 52b returns to the position of FIG. 13 in order to move the tumblers 53 into their respective bores 65 so that these tumblers do not project beyond the periphery of the barrel 51 and the latter may move to its extended position under the bias of the spring 51a as soon as the front edge portion of the cover 46 is moved away from the outer end face of the barrel.

The ends of the inwardly bent longitudinal edge portions 46a, 46b of the cover 46 are provided with abutment members or prongs 59, 61 which may engage with outwardly extending stops 60 provided beneath the flanges 45a, 45b so that the cover 46 may be arrested in the position of FIG. 15 when the stops 60 are engaged by the abutment members 59, and that the cover may also be arrested in the position of FIG. 16 when the stops 60 are engaged by the abutment member 61. In other words, the cover 46 is movable between a first end position (FIG. 15) in which it fully exposes and provides acess to the chamber 48, and a second end position (FIG. 16) in which it fully exposes the depository 48 which accommodates the Z key 1.

The receptacle 44 is utilized as follows:

When the supervisor obtains the receptacle from the cashier, the cover 46 assumes the position of FIG. 16 or 17 in which the barrel 51 of the locking device 49 projects upwardly and beyond the end face of the housing 52 so that the cover 46 cannot be moved to the right in order to expose the large chamber 48 and the cash receipts accommodated therein. The depository 47 is readily accessible because the cover 46 may be shifted to the left and into the position of FIG. 16 to the extent determined by the stops 60 and abutment members 61. Thus, the supervisor can withdraw the balance slip which is assumed to have been placed into the depository 47, and the supervisor thereupon utilizes his key 50 to move the barrel 51 from the position of FIG. 16 to that of FIG. 14 in order to shift the cover 46 over the upper end face of the insert the next day's cash receipts into the chamber 48 (FIG. 15). Once the supervisor removes the cash receipts, the receptacle 44 is ready to be handed over or sent to the cashier in the position as shown in FIG. 14 or 15, i.e. with the barrel 51 still depressed so that the cashier may insert the next day's cash receipts into the chamber 48 but cannot withdraw the Z-key from the depository 47 unless he seals the chamber 48. After inserting the cash receipts into the chamber 48, the cashier shifts the cover 46 from the position of FIG. 15 to that of FIG. 16 to seal the chamber 48 and to expose the Z key 1 in the depository 47. He then obtains the balance slip from the cash register by utilizing the key 1 and places the key as well as the balance slip into the depository 47. If he wishes he, may slide the cover 46 from the position of FIG. 16 to that of FIG. 17 to make sure that the key 1 or the balance slip is not lost, and then returns the receptacle 44 to the supervisor.

FIG. 18 illustrates a modified locking device 49' comprising a barrel 51' having a peripheral recess 62 for reception of a catch 61' provided at the right-hand end of the cover 46'. This catch may engage a preferably resilient tongue 63 provided in the recess 62 so as to lock the cover 46' to the barrel 51'. The supervisor's key for the locking device 49' is of such construction that it may release the tongue 63 from the catch 61' and that the supervisor may move the cover 46' to the position of FIG. 18 before he depresses the barrel 51' to the position corresponding to the position of the barrel 51 shown in FIG. 14. The advantage of the construction shown in FIG. 18 is that the cover 46' may be locked to the barrel 51' in order to make sure that the Z key 1 or the balance slip is not lost when the cashier returns the receptacle to the supervisor. However, and as explained hereinabove, the cashier cannot simultaneously reach the cash receipts in the chamber 48 and have access to the Z key 1 because the spring 51a automatically expels the barrel 51 or 51' as soon as the cover 46 or 46' is moved from the position of FIG. 14 or 15 to that of FIG. 16.

It is to be noted that the cashier cannot overcome with his hand the strength of the barrel 51, when the cover moves from the position of FIG. 15 to the position of FIG. 16. As a matter of fact, when the smaller edge of the cover 46 passes over the barrel 51, said barrel ascends under the bulge 46c under the action of the expansion spring 51a and then is locked by the tumblers 53, 53a. When the cover moves to the position of FIG. 16, the barrel remains locked, and cannot be unlocked without the digital key 50, passing through the slot 46d to enter the slot 51b.

If the cashier does not follow the instructions for operating the receptacle 2, 27, 36, 39 or 44 in the prescribed sequence, he will be compelled to return the receptacle to the supervisor either with the chamber for cash receipts unlocked or with the Z key outside the depository. This error or his attempt to defraud is then detected immediately. Each cash register has its own Z key.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptions should and are intended to be comprehended with the meaning and range of equivalence of the following claims.

What is claimed as new and desired to be secured by Letters Patent is:

1. A method of collecting cash receipts in the lockable chamber of a receptacle having a depository for the actuating member which is utilized for obtaining a balance slip from a cash register and wherein opening and locking of the chamber respectively result in blocking and unlocking of removal of the actuating member from the depository, said method comprising the steps of opening the chamber of the receptacle whereby removal of the actuating member from the depository is blocked so that, before inserting the receipts into the chamber, a person in posession of the receptacle cannot remove the actuating member from the depository to obtain the balance slip from the cash register; locking the chamber whereby removal of the actuating member from the depository in unblocked and the actuating member may be removed to obtain the balance slip from the register; and removing the actuating member from the depository.

2. A method of collecting cash receipts in the lockable first chamber of a receptacle having a lockable second chamber for the actuating member which is utilized for restoring to zero and for obtaining a balance slip from a cash register and wherein opening and locking of the first chamber respectively result in locking and unlocking of the second chamber, said method comprising the steps of opening the first chamber; whereby the second chamber is locked so that, before inserting the receipts into the first chamber, a person in possession of the receptacle cannot remove the actuating member from the second chamber; locking the first chamber whereby the second chamber is unlocked and provides access to the actuating member; obtaining the balance slip from and restoring to zero the cash register; and reinserting the actuating member into the second chamber.

3. A method of collecting cash receipts in the lockable first chamber of a receptacle having a lockable second chamber for the actuating member which is utilized for restoring to zero and for obtaining a balance slip from a cash register and wherein opening and locking of the first chamber respectively result in locking and unlocking of the second chamber, said method comprising the steps of opening the first chamber whereby the second chamber is locked so that, before inserting the receipts into the first chamber, a person in posession of the receptacle cannot remove the actuating member from the second chamber; locking the first chamber whereby the second chamber is locked and provides access to the actuating member; obtaining the balance slip from and restoring to zero the cash register; placing the balance slip and the actuating member into the second chamber; and locking the second chamber without unlocking the first chamber.

4. A receptacle for cash receipts and for the actuating member utilized for obtaining a balance slip from a cash register, said receptacle comprising a closable and lockable chamber for the cash receipts; closure means for said chamber movable between closing and opening positions; means for locking and unlocking said closure means; a depository for the actuating member having a blocking and an unblocking position; and operating means for interconnecting said locking means and said depository, said operating means constructed and arranged in such a way as to automatically maintain said depository in blocking position when the closure means is in opening position and to unblock said depository so as to provide access to the actuating member when said locking means locks the closure means in closing position, whereby the receipts contained in said chamber are not accessible to a person having access to the actuating member in said depository.

5. A receptacle for cash receipts and for the Z key utilized for obtaining a balance slip from a cash register, said receptacle comprising means defining a closable and lockable chamber for the cash receipts, said means having an open end; a frame secured to the open end of said means; a cover pivoted to said frame and movable between chamber closing and opening positions, said cover having an outer side which is accessible when the cover is in said closing position; a depository for the key located at the outer side of said cover; a blocking member adjacent to said depository and movable between a blocking and an unblocking position in which the key is respectively locked in and may be removed from said depository; and a mechanism operatively connected with said blocking member and with said cover, said mechanism comprising means for retaining the blocking member in blocking position when the cover is in said opening position and for permitting the blocking member to be manually moved to said unblocking positon when the cover is in said closing position, and means for automatically locking the cover to said frame in the closing position thereof in response to movement of the blocking member to said unblocking position.

6. A receptacle as set forth in claim 5, wherein said depository comprises a plurality of stirrups fixed to the cover.

7. A receptacle as set forth in claim 5, wherein said said chamber defining means is a flexible bag.

8. A receptacle as set forth in claim 5, wherein said cover has aperture means normally concealed by the Z key for permitting insertion of the Z key into said chamber when the key is removed from said depository.

9. A receptacle as set forth in claim 5, wherein said mechanism comprises a lever pivotably mounted in said cover and connected with said blocking member, said lever having a bolt receivable in a slot formed in said frame for locking the cover in closing position and said blocking member extending through a slot formed in said cover.

10. A receptacle as set forth in claim 9, wherein said lever comprises a head having a plurality of spaced notches, said mechanism further comprising a pair of interconnected pawls having pallets selectively receivable in said notches and a locking device comprising means for expelling the pallets from said notches.

11. A receptacle for cash receipts and for the Z key utilized for obtaining a balance slip from a cash register, said receptacle comprising means defining a first and a second closable and lockable chamber for respectively accommodating the cash receipts and the key; means for separating said chambers from each other; a first and a second element, each of said elements movable between a closing and opening position for respectively closing and exposing said first and second chamber; a hollow casing interposed between said elements; first and second catch means respectively provided on said first and second element and receivable in spaced slots formed in said casing when the elements are pivoted to said closing positions thereof; a blocking member extending through a further slot formed in said casing, said blocking member manually movable with respect to said casing in two opposite directions; and a mechanism operatively connected with said blocking member and mounted in said casing, said mechanism comprising first and second bolt means for respectively engaging said first and second catch means, said bolt means connected with said blocking member, and means for operating said block means in a predetermined sequence so as to disengage said first block means from said first catch means when the second block means engages said second catch means, to disengage said second bolt means from said second catch means and to engage said first bolt means with said first catch means in response to manual displacement of said blocking member with respect to said casing in a first direction, and to simultaneously engage both said bolt means with the respective catch means in response to movement of said blocking member in the opposite direction.

12. A rigid receptacle as set forth in claim 11, wherein said elements are pivotable doors.

13. A receptacle as set forth in claim 11, wherein said chamber defining means is a flexible bag and said elements are pivotable U-shaped frame members fixed to said bag.

14. A receptacle as set forth in claim 11, wherein said elements are zippers.

15. A receptacle as set forth in claim 11, wherein said mechanism comprises a toothed rack connected with said blocking member and having a pair of end portions constituting said first and second bolt means, a pivotable lever including a toothed member meshing with said rack, pawl means having pallet means receivable in spaced notches formed in said lever, resilient means for biasing said pawl means into engagement with said lever, and a locking device for disengaging said pallet means from said lever.

16. A receptacle as set forth in claim 15, wherein said toothed rack comprises a first elongated member having an end portion constituting one of said bolt means, a second elongated member having an end portion constituting the other bolt means, and a connecting link articulately fixed to said elongated members and pivoted to said casing.

17. A receptacle for cash receipts and for the Z key utilized for obtaining a balance slip from a cash register, said receptacle comprising means defining a closable and lockable first chamber for receiving the cash receipts, said means having an open end; a frame fixed to said open end and defining a closable second chamber for the Z key; a cover connected with and movable with respect to said frame between a first position in which it exposes said first chamber while closing said second chamber, a second position in which it exposes said second chamber while closing said first chamber, and a third position in which it closes said first and second chambers; and means operatively connected with said frame for locking the cover against movement from said second position back to said first position so that the cash receipts deposited in said first chamber are locked when the Z key in said second chamber is accessible.

18. A receptacle as set forth in claim 17, further comprising stop means fixed to said frame and abutment means fixed to said cover for arresting the cover in said first and second positions thereof.

19. A receptacle as set forth in claim 17, wherein said locking means comprises a spring-biased barrel reciprocably mounted in said frame and movable between a depressed position in which it permits the cover to move to said first position thereof and an extended position in which it prevents movement of the cover from said second to said first position.

20. A receptacle as set forth in claim 19, further comprising catch means mounted on said cover and tongue means mounted on said barrel for engaging said catch means and for locking the cover in said third position thereof.

References Cited in the file of this patent

UNITED STATES PATENTS 2,169,855     Stough _____ Aug. 15, 1939